United States Patent [19]

Edgerton

[11] Patent Number: 4,708,541

[45] Date of Patent: Nov. 24, 1987

[54] VALVE SEAT CUTTING TOOL

[75] Inventor: Willie H. Edgerton, Florence, S.C.

[73] Assignee: Wilbert Ouzts, Florence, S.C.

[21] Appl. No.: 837,674

[22] Filed: Mar. 10, 1986

[51] Int. Cl.⁴ .............................................. B23B 41/00
[52] U.S. Cl. .............................. 408/83.5; 29/157.3 A; 29/402.06; 29/402.08; 407/54
[58] Field of Search .................. 29/157.1 R, 156.7 R, 29/156.7 A, 402.01, 402.03, 402.04, 402.05, 402.06, 402.08, 505; 407/54, DIG. 67; 408/200, 83.5

[56] References Cited

U.S. PATENT DOCUMENTS

| | | |
|---|---|---|
| Re. 26,452 | 9/1968 | Dearborn .............................. 77/68 |
| 1,113,674 | 10/1914 | Moore .............................. 408/83.5 |
| 1,127,175 | 2/1915 | Brooks .............................. 408/83.5 |
| 1,235,604 | 7/1917 | Royle . |
| 1,390,022 | 9/1921 | Coakley . |
| 1,974,620 | 9/1934 | Mesing .............................. 408/83.5 |
| 1,988,411 | 1/1935 | Beard .............................. 408/83.5 |
| 2,069,153 | 1/1937 | Konkle .............................. 29/157.1 |
| 2,069,933 | 2/1937 | Albertson ...................... 29/156.7 A |
| 2,102,707 | 12/1937 | Holhut .............................. 408/83.5 |
| 2,289,065 | 7/1942 | Oliver .............................. 77/67 |
| 2,416,228 | 2/1947 | Sheppard .............................. 408/83.5 |
| 2,490,977 | 12/1949 | Milbrath et al. .................. 408/83.5 |
| 2,587,980 | 3/1952 | Doepker .............................. 77/67 |
| 3,260,139 | 7/1966 | Sanborn .............................. 77/67 |
| 3,516,329 | 6/1970 | Rerdahl .............................. 408/83.5 |
| 3,736,640 | 6/1973 | Freiheit .............................. 29/157 |
| 3,991,456 | 11/1976 | Lieser .............................. 29/157.1 |
| 4,395,169 | 7/1983 | Kashigawa et al. .................. 408/59 |
| 4,468,158 | 8/1984 | Pearce et al. ...................... 408/83.5 |
| 4,545,706 | 10/1985 | Hiroyasu et al. .................. 408/83.5 |

*Primary Examiner*—Howard N. Goldberg
*Assistant Examiner*—Irene Graves Golabi
*Attorney, Agent, or Firm*—Benoni O. Reynolds

[57] ABSTRACT

A tool and method for repairing valve seats of hydraulic jacks. The valve seat cutting tool is a cylindrical shank of hardened steel with a beveled cutting face at its lower end, the upper end being suitable for engagement by a conventional drilling mechanism. The beveled cutting face, although lying in a single surface, has a forward cutting face beveled back to front at a 17 degree angle and a side cutting face beveled at a 5 degree angle increasing from left to right. The cutting faces are cut at right angles to one another. The size of tool is geared to the diameter of the valve chamber and the ball to be seated. The diameter of the tool, selected from a series of 18 of the same configuration, is slightly less than the diameter of the valve chamber and of the ball to be seated. The tool is centered by the existing recess in which the ball rests. The tool is inserted in the valve chamber and is rotated a few revolutions to square off the walls and bottom surface of the old valve seat. The new valve seat is formed by lightly tapping the top of the replacement ball to be seated with a rod struck by a hammer or other appropriate means.

1 Claim, 10 Drawing Figures

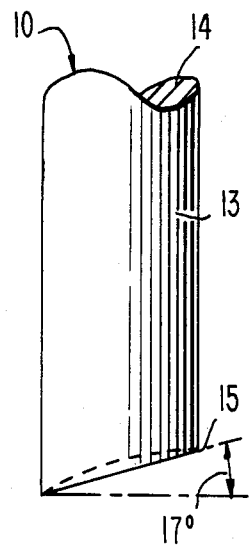
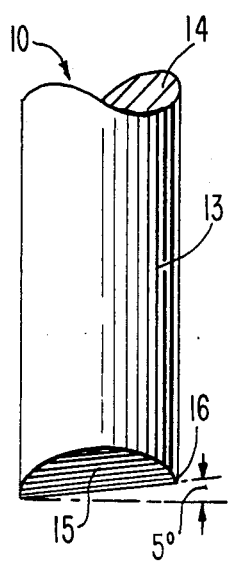
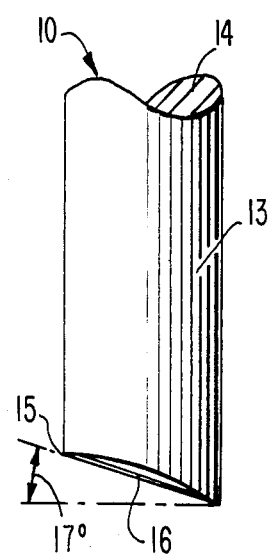
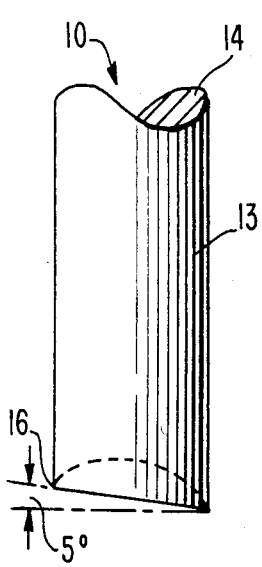
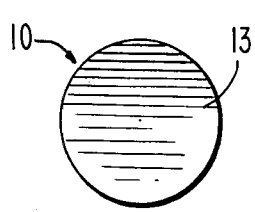
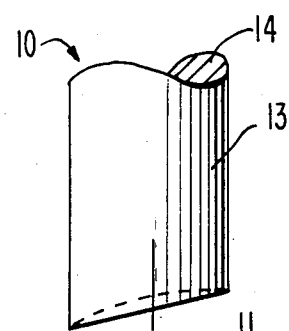
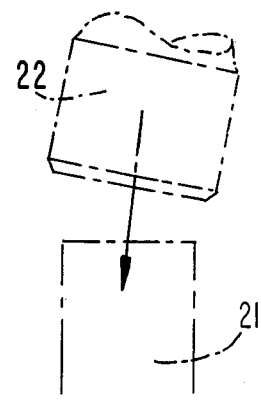
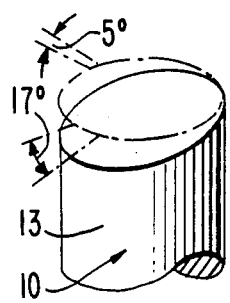
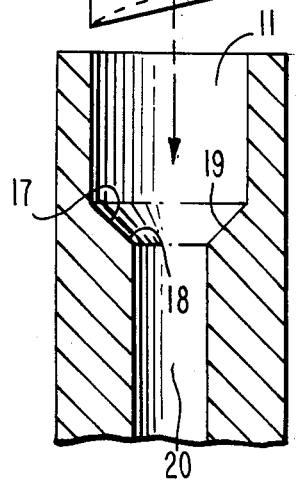
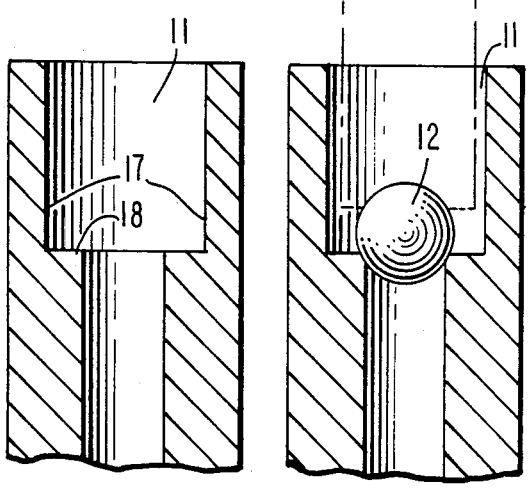

VALVE SEAT CUTTING TOOL

BACKGROUND OF THE INVENTION

(1) Field of Invention

This invention relates generally to cutting tools and methods for repairing ball valve seats. More particularly it relates to the repair of valve seats in hydraulic jacks.

(2) Description of Prior Art

There are generally two recognized methods for repairing valve seats in hydraulic jacks. One method involves reamers, where drills with beveled ends attempt to repair the valve by smoothing out the walls of the old seat. A second method involves the use of inserts. An insert containing a new seat is slipped in on top of the old seat and sealed by means of impact (see Freiheit '640). Neither of these recognized methods is foolproof, because it is difficult to remove all defects in the old walls with a reamer and inserts do not always form a tight seal. The net results in many cases are continued leaks and inefficient pumping action. The method and tool of the present invention provide a much more simple, direct and rapid means for accomplishing the repair. The design of the tool controls the depth and precision of the cut. The range of diameters permits essentially all known jacks to be repaired. If the steps of the method are followed precisely there is virtually no chance of a faulty repair job. Prior Art known to this inventor includes the following U.S. Pat. Nos:

| 1,235,604 | 8/1917 | Royle |
| 2,069,153 | 1/1937 | Konkle |
| 2,289,065 | 7/1942 | Oliver |
| 2,587,980 | 3/1952 | Doepker |
| 3,260,139 | 7/1966 | Sanborn |
| 3,736,640 | 6/1973 | Freiheit |
| Re. 26,452 | 9/1968 | Dearborn |
| 3,991,456 | 11/1976 | Lieser |
| 4,395,169 | 7/1983 | Kashiwagi et al |

BRIEF SUMMARY OF THE INVENTION

The tool of the present invention is a valve seat cutting tool for repairing valve seats of hydraulic jacks. The tool is a cylindrical shank of hardened steel having a forward cutting face which is beveled from back to front and a side cutting face which is beveled increasing from the left side to the right side of the cylindrical shank when viewed facing the forward cutting face of the cylindrical shank. The upper end of the cylindrical shank is suitable for engagement by any conventional drilling mechanism such as a hand held electrical speed drill. The angle of the forward cutting face is beveled at a 17 degree angle and the angle of the side cutting face is beveled at a 5 degree angle, both angles with respect to the horizontal plane of the cylindrical shank when the cylindrical shank is in a vertical position. The forward cutting face and the side cutting face lying in the same plane forming a single surface and the angle of the forward cutting face and the angle of the side cutting face are cut at right angles to one another.

The method of the present invention for repairing valve seats of hydraulic jacks uses a series of 18 valve seat cutting tools each of which has a cylindrical shank of hardened steel whose upper end is suitable for engagement by a conventional drilling mechanism, each cylindrical shank having a forward cutting face which is beveled from back to front at an angle of 17 degrees with respect to the horizontal plane of the cylindrical shank and having a side cutting face which is beveled at a 5 degree angle with respect to the horizontal plane of the cylindrical shank, which 5 degree angle increases from the left side to the right side of the cylindrical shank when viewed facing the forward cutting face of the cylindrical shank, both cutting surfaces forming a single surface and the angles of which cutting faces are cut at right angles to one another. The method comprises the steps of:

(1) removal of the old ball from the valve seat and valve chamber, and (2) selection from the series of tools of a valve seat cutting tool which has a slightly smaller diameter than the valve chamber and the new ball being seated, and (3) placing the selected valve seat cutting tool in the valve chamber and centering the valve seat cutting tool in the recess at the bottom surface of the valve chamber, and (4) rotating the valve seat cutting tool several turns by means of a conventional drilling mechanism, thereby squaring off the walls of the valve chamber so that the walls are at a 90 degree angle with respect to the bottom surface of the valve chamber, and (5) placing the new ball to be seated over the recess at the bottom surface of the valve chamber and seating the ball therein by lightly tapping the ball on its top using a rod and a hammer or other similar instruments, thereby forming a new valve seat in the valve chamber.

OBJECTIVES OF THE INVENTION

The objectives of the present invention are to provide a tool and method for repairing ball valve seats, for hydraulic jacks, in which:

(1) the tools and method are less expensive than those in current use;

(2) the tools and method are quick and easy to use;

(3) the cutting tool controls the depth and precision of the cut for the new valve seat;

(4) the resulting repair has a high degree of reliability against leakage;

(5) the cutting edge of the cutting tool, when worn, is easily reground to the proper angle;

(6) sufficient tools are available to repair the complete range of hydraulic jacks on the market;

Other objectives and advantages of the present invention will be apparent during the course of the following detailed description.

BRIEF DESCRIPTION OF THE DRAWINGS

FIG. 1 is an elevational view from the left side of a valve seat cutting tool, constructed in accordance with the principles of the present invention, showing the forward cutting face which is beveled at a 17 degree angle from back to front.

FIG. 2 is an elevational view from the front of the same present invention, after it has been rotated clockwise 90 degrees from the position shown in FIG. 1, showing the forward cutting face which is beveled back to front and the side cutting face which is beveled at a 5 degree angle increasing from the left side to the right side.

FIG. 3 is an elevational view from the right side of the same present invention, after it has been rotated clockwise 90 degrees from the position shown in FIG. 2, showing the side cutting face which is beveled increasing from the left side to the right side and front cutting surface which is beveled at a 17 degree angle from back to front.

FIG. 4 is an elevational view from the back of the same present invention, after it has been rotated clockwise 90 degrees from the position shown in FIG. 3, showing the side cutting face which is beveled at a 5 degree angle increasing from the left side to the right side when viewed from the foreward cutting face.

FIG. 5 is a bottom view of the present invention showing that the forward cutting face and the side cutting face form a single surface.

FIG. 6 is a cross-sectional view of a typical valve seat and valve chamber of a hydraulic jack showing the third step of the method of the present invention where the tool of the present invention is being placed in the valve chamber.

FIG. 7 is a cross-sectional view of the same valve seat and valve chamber after the fourth step of the method of the present invention where the tool of the present invention has been used to square off the walls of the valve chamber.

FIG. 8 is a cross-sectional view of the same valve seat and valve chamber at the beginning of the fifth and last step in the method of the present invention where the new ball is being tapped to be seated.

FIG. 9 is a cross-sectional view of the same valve seat and valve chamber after the fifth and last step of the method of the present invention showing the repaired vave seat without the new ball.

FIG. 10 is an isometric view showing the relationship between the forward cutting face and the side cutting face of the present invention.

DETAILED DESCRIPTION OF THE PREFERRED EMBODIMENT OF THE INVENTION

The tool and method of the present invention provide a valve seat cutting tool and a method using the tool for quickly and efficiently repairing valve seats of hydraulic jacks. FIGS. 1-4 show the valve seat cutting tool, constructed in accordance with the principles of the present invention, from the four 90 degree quadrants as the tool is rotated clockwise through a full turn of 360 degrees.

The exact diameter of the appropriate valve seat cutting tool, shown generally at reference numeral 10, to carry out a particular repair, will depend upon the diameter of the valve chamber 11 and the ball 12 of the hydraulic jack (not shown) being repaired. A series of 18 such valve seat cutting tools 10 will enable an individual to repair the entire range of hydraulic jacks which are routinely encountered. The length of cylindrical shank 13 should be at least four inches but usually no longer than six inches, to accommodate the depth of most valve chambers 11. The upper end 14 of cylindrical shank 13 is suitable for engagement by a conventional drilling mechanism (not shown), such as a hand held electric drill. Providing this suitability may entail constructing some valve seat cutting tools 10 with a cylindrical shank 13 of less cross-section diameter at its upper end 14 than the diameter of the remaining portion of cylindrical shank 13. Upper end 14 should be constructed to accommodate conventional drilling mechanisms which are usually designed to accommodate, at a maximum, bits up to either ⅜ inches or ½ inches in diameter.

Valve seat cutting tool 10 has a cylindrical shank 13 of hardened steel with a forward cutting face 15 which is beveled from back to front of cylindrical shank 13 as shown best in FIG. 2. As shown in FIGS. 1 and 3, the angle of forward cutting face 15 is beveled at a 17 degree angle with respect to the horizontal plane of cylindrical shank 13 when cylindrical shank 13 is in a vertical position as it is in FIGS. 1-4.

Cylindrical shank 13 also has a side cutting face 16, best shown in FIG. 3. As shown in FIG. 2, side cutting face 16 is beveled increasing from the left side to the right side of cylindrical shank 13, when viewed facing forward cutting face 15. As shown in FIGS. 2 and 4, side cutting face 16 is beveled at a 5 degree angle with respect to the horizontal plane of cylindrical shank 13 when cylindrical shank 13 is in a vertical position as it is in FIGS. 1-4.

Although described separately, forward cutting face 15 and side cutting face 16 form a single surface, as best shown in FIG. 5. Also, as shown in FIGS. 1-4, forward cutting face 15 and side cutting face 16 are cut at right angles to one another. Functionally, forward cutting face 15 centers valve seat cutting tool 10 in valve chamber 11, whereas, side cutting face 16 controls the depth of the cut in squaring off walls 17 with respect to bottom surface 18 of valve chamber 11.

The method of the present invention utilizes a series of 18 valve seat cutting tool 10 of different diameters for repairing valve seats of hydraulic jacks, each valve seat cutting tool 10 having a cylindrical shank 13 of hardened steel whose upper end 14 is suitable for engagement by a conventional drilling mechanism (not shown), each cylindrical shank 13 having a forward cutting face 15 which is beveled back to front at an angle of 17 degrees with respect to the horizontal plane of cylindrical shank 13 and having a side cutting face 16 which is beveled at a 5 degree angle with respect to the horizontal plane of cylindrical shank 13 which 5 degree angle increases from the left side to the right side of cylindrical shank 13 when viewed facing forward cutting face 15 of cylindrical shank 13, both cutting faces 15 and 16 forming a single surface and the angles of which cutting faces 15 and 16 are cut at right angles to one another.

The steps of the method of the present invention are:

(1) removal of old ball 12 from valve seat 19 and valve chamber 11, and (2) selection from the series of 18 valve seat cutting tools 10 of a valve seat cutting tool 10 which has a slightly smaller diameter than valve chamber 11 and the new ball 12 being seated, (thus, the walls of valve chamber 11 support valve seat cutting tool 10 in the proper position during the cutting operation), and (3) as depicted in FIG. 6, placing the selected valve seat cutting tool 10 in valve chamber 11 and centering the valve seat cutting tool 10 in the recess 20 at bottom surface 18 of valve chamber 11, (valve seat cutting tool 10 will not cut unless centered in recess 20), and (4) rotating valve seat cutting tool 10 several turns by means of a conventional drilling mechanism (not shown), thereby squaring off the walls 17 of valve chamber 11, as shown in FIG. 7, so that walls 17 are at a 90 degree angle with respect to the bottom surface 18 of valve chamber 11, (the depth of the cut is controlled by the configuration of cutting faces 15 and 16), and (5) as depicted in FIG. 8, placing the new ball 12, to be seated, over recess 20 at the bottom surface 18 of valve chamber 11 and seating new ball 12 therein by lightly tapping ball 12 on its top using a rod 21 and a hammer 22, or other similar instruments, thereby forming a new valve seat 23 in valve chamber 11 (the tapping deforms the top of new recess 20, causing the squared off recess 20 to take on the characteristic shape of new ball 12).

As only three or four turns of valve seat cutting tool 10 are required, the valve seat cutting operation is relatively quick to carry out. Also, as the existing valve chamber 11 and recess 20 serve to center and control the position of the tool, the operation is fairly foolproof. Further, the novel beveled cutting faces 15 and 16 can easily be restored when tool 10 becomes worn or otherwise damaged. In addition, cutting faces 15 and 16 control the depth of the cut so that the old valve seat is precisely squared off. Valve seat cutting tool 10 will not cut past the the squared off point.

I claim:

1. A valve seat cutting tool, for repairing valve seats of hydraulic jacks, comprising:
    a cylindrical shank of hardened steel having at a lower end a forward cutting face and a side cutting face lying in the same plane forming a single surface and the angle of said forward cutting face and the angle of said side cutting face are cut at right angles to one another which said forward cutting face is beveled from back to front at a 17 degree angle and which said side cutting face is beveled increasing from the left side to the right side of said cylindrical shank at a 5 degree angle, both angles with respect to the horizontal plane of said cylindrical shank, when viewed facing said forward cutting face of said cylindrical shank in a vertical position, the upper end of said cylindrical shank being suitable for engagement by a conventional drilling mechanism.

* * * * *